C. L. BOSSOLT.
DIRECTION INDICATOR FOR MOTOR VEHICLES.
APPLICATION FILED NOV. 12, 1920.
1,391,937.
Patented Sept. 27, 1921.
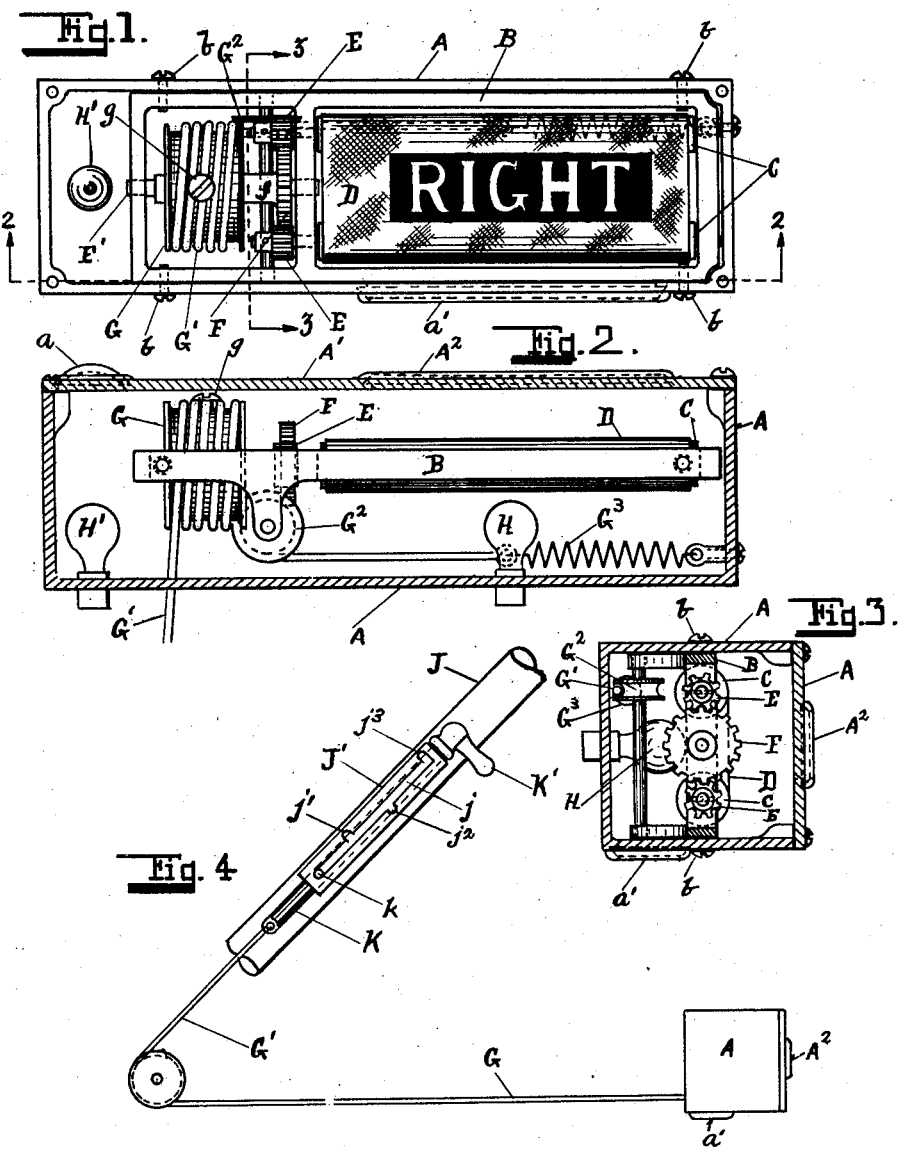

UNITED STATES PATENT OFFICE.

CHARLES L. BOSSOLT, OF ERIE, PENNSYLVANIA, ASSIGNOR OF ONE-HALF TO JOHN C. BOSSOLT, OF ERIE, PENNSYLVANIA.

DIRECTION-INDICATOR FOR MOTOR-VEHICLES.

1,391,937.     Specification of Letters Patent.     Patented Sept. 27, 1921.

Application filed November 12, 1920. Serial No. 423,607.

*To all whom it may concern:*

Be it known that I, CHARLES L. BOSSOLT, a citizen of Canada, residing at Erie, in the county of Erie and State of Pennsylvania, have invented certain new and useful Improvements in Direction-Indicators for Motor-Vehicles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to direction indicators for motor vehicles; the object thereof being to provide mechanism which will indicate to a following vehicle, which direction is going to be taken at an intersection.

The features of my invention are hereinafter set forth and pointed out, and are illustrated in the accompanying drawings in which:—

Figure 1, is a front elevation thereof with the front plate removed.

Fig. 2, is a horizontal section on the line 2—2 in Fig. 1.

Fig. 3, is a transverse section on the line 3—3 in Fig. 1.

Fig. 4, is a diagrammatic drawing showing mechanism for operating the direction indicator.

In these drawings A indicates a box-like case which is provided with a cover A' (see Fig. 2) said cover being provided with a window opening $A^2$. Within the case A I secure a frame B by means of screws $b$ or in any other convenient manner. Within the frame B I mount a pair of rollers C upon which rollers C a web of semi-transparent material D is secured so that when the rollers C are rotated in one direction the web D rolls from one roller to the other.

Upon the web D I place words or other symbols indicating the right or left hand direction; also the word "Stop", and also a blank space. Upon the journals C at one end thereof I place spur pinions E E, and I mount in the frame B, mid-way between the pinions E, a spur gear F, which intermeshes with the pinions E. I preferably provide the spur gear F with a long hub $f$, said wheel F and hub $f$ being preferably mounted upon a supporting shaft F'. Upon the hub $f$ I non-rotatably fix a spool G, around which I wrap several turns of flexible cable G'; one end of said cable leading forward to the operating means shown in Fig. 4, and the other end thereof running around an idler pulley $G^2$, to a spring $G^3$ behind the rollers C.

The cable G' is secured to a screw $g$ in the spool G so that it cannot slide around the periphery of the spool. Behind the rollers C within the case A I place an electric lamp H so that the light therefrom will illuminate the semi-transparent material D and thereby cause the symbols printed thereon to show in the darkness. The front plate A' of the case A is also provided with a ruby lens $a$ adjacent to one end thereof, behind which I place a lamp H' to serve as a tail light for the vehicle.

The case A is also preferably provided with a window opening $a'$ in the under side thereof, through which rays of light from the lamp H can shine on a license plate secured under the case A.

Upon the steering post J of the vehicle, I secure a sleeve J' having a longitudinal slot $j$ in the wall thereof; said slot being provided with notches $j'$, $j^2$, $j^3$. Within the sleeve J is placed a rod K, which rod K is provided with a stud $k$ which operates in the slot $j$ and is adapted to enter in one of the notches $j'$, $j^2$, $j^3$. On the upper end of the rod K I secure a handle K' by means of which the rod K may be raised or lowered in the sleeve J and turned therein so that the stud $k$ will enter one of the notches $j'$, $j^2$, $j^3$. To the lower end of the rod K the cable G hereinbefore mentioned, extends and is secured, so that when the handle K' is grasped and the rod K raised upwardly in the sleeve J, the gear mechanism within the case A hereinbefore described, will cause the fabric D to move until the stud $k$ enters the desired notch $j'$, $j^2$ or $j^3$, which will bring the desired symbol on the flexible material D opposite window $A^2$ in the front plate of the case A.

I preferably place the symbols on the web D in such position that when the stud $k$ on the rod K is at the lower end of the slot $j$, the word "Stop" will be shown at the window $A^2$; and when the stud $k$ is in the notch $j'$ the blank space of the web D will appear at said window. When the handle K' turns the rod K so that the stud $k$ will enter the notch $j^2$, the word "Left" will be shown on the web D, and likewise, when the handle K' is turned in the opposite direction so that the stud $k$ will enter the notch $j^3$, the word "Right" will appear.

The turning of the handle K' to cause the stud $k$ to enter the notches $j^2$ and $j^3$ being the same as though said handle was used to steer the vehicle, so that the driver can glance at the said handle and know what sign is shown at the window $A^2$.

From the foregoing description of the construction of my improved direction indicator, it is believed that the operation thereof will be obvious to those skilled in the art, and therefore further description thereof is deemed unnecessary. Therefore having shown and described my invention so that others may utilize the same, what I claim as new and desire to secure by Letters Patent is:

In a device of the class described, a frame, a pair of spaced parallel rollers, a curtain having its opposite ends secured to and wrapped around each of said rollers in opposite directions, journal pins in the ends of said rollers and mounted in said frame, a pinion gear secured on two of said journal pins at one end of said frame, a supporting shaft secured in one end of said frame, a spur-gear mounted on said shaft and intermeshing with each of said pinion gears, a spool secured to said spur gear, a cable wrapped around said spool and leading to an operating device to operate said spur gear in one direction, and spring actuated mechanism to operate said spur gear in the opposite direction, whereby said curtain is caused to wind from one roller to the other roller.

In testimony whereof I affix my signature.

CHARLES L. BOSSOLT.